United States Patent [19]

Harshbarger, Jr. et al.

[11] Patent Number: 4,852,360
[45] Date of Patent: * Aug. 1, 1989

[54] HEAT PUMP CONTROL SYSTEM

[75] Inventors: John H. Harshbarger, Jr.; John H. Harshbarger, III, both of Xenia, Ohio

[73] Assignee: Visual Information Institute, Inc., Xenia, Ohio

[ * ] Notice: The portion of the term of this patent subsequent to Dec. 9, 2003 has been disclaimed.

[21] Appl. No.: 130,076

[22] Filed: Dec. 8, 1987

[51] Int. Cl.$^4$ ............................................. F25D 21/02
[52] U.S. Cl. ...................................... 62/126; 62/156; 62/160; 165/29
[58] Field of Search ................. 62/156, 155, 234, 126, 62/127, 128, 129, 160, 157; 165/29, 11 R, 12

[56] References Cited

U.S. PATENT DOCUMENTS

| | | | |
|---|---|---|---|
| 3,159,981 | 12/1964 | Huskey | 62/156 |
| 3,186,477 | 6/1965 | Bell, Jr. | 165/2 |
| 3,222,882 | 12/1965 | Sutton, Jr. et al. | 62/156 X |
| 4,263,962 | 4/1981 | Noland | 168/17 |
| 4,353,409 | 10/1982 | Saunders et al. | 165/2 |
| 4,373,350 | 2/1983 | Noland | 62/156 |
| 4,407,138 | 10/1983 | Mueller | 62/126 |
| 4,441,901 | 4/1984 | Eudoh | 62/160 |
| 4,574,871 | 3/1986 | Parkinson et al. | 165/29 X |
| 4,627,483 | 12/1986 | Harshbarger, Jr. et al. | 165/29 X |
| 4,627,484 | 12/1986 | Harshbarger, Jr. et al. | 165/29 X |

FOREIGN PATENT DOCUMENTS

| | | | |
|---|---|---|---|
| 0142137 | 8/1983 | Japan | 62/156 |
| 0200145 | 11/1984 | Japan | 62/156 |

Primary Examiner—Harry B. Tanner
Attorney, Agent, or Firm—Jeffers, Hoffman & Niewyk

[57] ABSTRACT

A control system for controlling a heating system having a heat pump and a source of supplemental heat. The indoor heat exchanger temperature is monitored, such as by a thermocouple or the like, and when the temperature falls below a given threshold level, defrost cycling of the heat pump is initiated. The control system monitors the defrost cycling of the heat pump, and when the heat pump is in its defrost cycle for more than a predetermined portion of a heating cycle, the heat pump will be shut down until the outdoor ambient temperature has risen by a predetermined amount or a given interval of time has elapsed.

8 Claims, 4 Drawing Sheets

HEAT PUMP CONTROL SYSTEM

BACKGROUND OF THE INVENTION

The present invention relates to a control system for a heat pump which causes the heat pump to go into its defrost mode when a particular inside heat exchanger condition is reached.

The present invention also relates to a heating system employing both a heat pump and a source of supplemental heat, such as a resistance heat furnace or a fossil fuel furnace, and relates in particular to a control system whereby greater efficiency in the utilization of the two heat sources is realized.

A heat pump utilizes a compressor and a refrigerant recirculation system including a condenser and evaporator to provide both cooling in the warmer seasons of the year and heating in the winter. When heating, the high temperature condenser is located in the interior space and the lower temperature evaporator is located outdoors to extract heat from the outside air and transfer it to the interior space through the condenser.

Since heat pumps utilize outside ambient air in contact with the evaporator as the heat source during the winter months, they operate efficiently only when the outside air temperature is above a certain level, such as 40°, for example. In regions of colder average winter temperatures, supplemental heat, such as is supplied by fossil fuel furnaces or resistive heat, is necessary in order to maintain the temperature within the building at the desired level. As the outside temperature drops, there is less heat available for transfer to the interior condenser, so that the system eventually reaches a point where the heat transfer is not adequate to satisfy the heat demand called for by the thermostat Furthermore, as the outside ambient temperature drops, the efficiency of the heat pump suffers because of frost buildup on the evaporator coils, which occurs at a greater rate with a progressive decrease in the outside ambient temperature.

In the defrost cycle, the heat pump is run in the reverse direction to transfer heat from the warmer indoor condenser coil to the outside evaporator coil, thereby melting the frost. Following the defrost cycle, normal operation can be resumed, assuming that heat is called for by the thermostat. Of course, during the defrost cycle of the heat pump, heat is not being supplied to the building, and the supplemental heat must be relied on to maintain the desired ambient temperature. This requires that both the supplemental heat unit and the heat pump be operated simultaneously, the former to maintain the desired heat level within the building, to provide heat for the defrost cycle, and the latter to eliminate the frost build-up so that the heat pump can return to normal operation.

Whenever the outside ambient is below that which permits adequate transfer of heat, both the heat pump and the supplemental heat source are operating simultaneously, with greater energy demand than with the heat pump operating alone or with the supplemental heat operating alone. When the heat pump and supplemental heat source are operating together beyond a certain portion of the heat cycle, there is greater energy consumption than if only the supplemental heat source alone is used for a given quantity of heat delivered. During the defrost cycle of the heat pump, energy is required to heat the outside evaporator coils, and supplemental heat is necessary to maintain the desired inside temperature level called for by the thermostat and to provide adequate heat for defrost operation. Accordingly, if frequent and lengthy defrost cycles are necessary to maintain the evaporator coils free of frost, less energy will be consumed by operating the supplemental heating alone and shutting down the heat pump entirely. This is true even though the heat pump operation is generally more efficient than supplemental heating, for example resistance or fossil fuel burning, depending on the outside temperature and humidity conditions. The buildup of frost on the evaporator coils is a function of the outside ambient temperature and also the dew point. If the dew point is high, moisture will condense on the evaporator coils and turn to frost at a higher temperature than if the dew point is lower.

Prior art control of heat pump operation is generally accomplished by means of an electromechanical thermostat mechanism, with separate temperature sensors for each state of heat pump system operation. Furthermore, there are defrost timers, relays, and pressure and temperature sensors utilized to control system defrost cycling. The weather and condition of the heat pump system form a complex set of factors that are constantly changing, thereby making it very complex to determine the combination of heat pump and resistive heating which renders maximum efficiency. To maintain the heat pump system in the most efficient state would require the user to continually measure all of these factors and perform complex computations. Accordingly, prior art heat pump installations do not have the means available to the user to efficiently operate the heat pump systems in the lowest energy demand state while maintaining the temperature of the building at the desired level.

To summarize, the current problem with heat pump installations is that their advantage over other methods of heating exists only when the heat pump operates without supplemental heat. The more frequently that the heat pump operates with supplemental heat, either during its heating cycle when the outside ambient temperature is so low that the heat pump is not able to satisfy the heat demand, or during its defrost cycle, the less advantage there is in terms of energy efficiency over other heating plants, such as resistance or fossil fuel furnaces. This has resulted in heat pumps being used more often in regions where the outdoor temperatures are sufficiently high during the winter months that the need for supplemental heat is infrequent, such as in the Southern and Southwestern regions of North America. The use of heat pumps in cooler Northern climates, particularly in those climates where the air humidity is high during the winter months, requires very complex controls which, although perhaps they can be justified for large buildings, are not feasible for domestic and smaller commercial and industrial installations.

All heat pumps have a built in control system for switching the heat pump over to its defrost mode. In the defrost mode, a reversing valve connected at the discharge of the compressor reverses the flow of refrigerant through the condenser and the evaporator. In the winter, the indoor heat exchanger coil functions as the condenser and receives compressed refrigerant which then gives up heat to interior ambient air blown over the indoor heat exchanger coil by a fan. The outdoor coil functions as the evaporator and absorbs heat from the outdoor ambient. When defrosting of the outdoor coil is necessary, the heat pump control system activates a relay or the like which reverses the reversing valve, thereby causing refrigerant from the compressor to be pumped through the outdoor heat exchanger coil, which now functions as a condenser, and gives up heat to the exterior surface of the coil so as to melt any ice or frost that has built up thereon. After a given period of time, as determined by a timer in the heat pump defrost control system, the reversing valve is reversed and the indoor coil again functions as the condenser.

A variety of techniques have been utilized to determine when the heat pump should go into its defrost mode, such as monitoring the outdoor coil temperature, monitoring the outdoor ambient temperature and monitoring compressor motor current. In a simpler system, a timer causes the heat pump to go into the defrost mode on a periodic basis. In some systems, a variety of detected conditions are analyzed by a microcomputer to determine if and when the heat pump should defrost.

A disadvantage to all of the prior art techniques for determining when the heat pump should defrost is that they rely on conditions which are either unrelated or, at best, only indirectly related to the efficiency of the heat pump. For example, monitoring of outdoor temperature may provide some measure of how often defrosting is necessary, but systems utilizing outdoor ambient temperature as the monitored condition for defrost will often go into the defrost mode when there is little, if any, build up of frost on the outdoor coil. It should be noted that the defrost mode for a heat pump is extremely inefficient in terms of heating a building because it causes the internal coil to become the colder, evaporator coil over which the interior air is passed during the defrost cycle. Accordingly, not only is the heat pump not operating, but it is operating in a manner which is counterproductive to the heating of the building. On the other hand, in some prior art systems, defrost cycling may not be initiated even though it is needed in that the system is operating at very low efficiency. For example, if the outdoor humidity is high but the system only monitors outdoor temperature to determine defrost frequency, frost may form on the outdoor coil and cause the system to run at very low efficiency until defrost is initiated by the system timer.

SUMMARY OF THE INVENTION

The present invention monitors only the indoor heat exchanger coil temperature, either the heat exchanger coil itself or the air immediately surrounding the heat exchanger coil, to determine when defrosting is necessary. Because the true measure of heat pump system performance is the temperature of the indoor heat exchanger coil, if frost builds up on the outdoor coil, the outdoor coil will not be as efficient in drawing heat from the outdoor air, and the temperature of the indoor heat exchanger coil will drop. The system of the present invention detects this drop in the indoor coil temperature below a set threshold level, and then provides an actuating signal to the heat pump defrost control, which activates the defrost relay to reverse the reversing valve at the output of the compressor. When defrost is initiated, the normal heat pump defrost control system will cause the heat pump to run through its normal defrost cycle for a given period of time, and will then reinitiate heat pump operation in the normal heating mode. Thus, the invention substitutes the monitoring of indoor coil temperature to produce the defrost initiating signal in place of the customary defrost initiating criterion, such as outdoor ambient temperature, outdoor coil temperature, compressor current draw or a microcomputer output that analyzes one or more of these conditions to determine when defrosting should be initiated.

The present invention also relates to utilization of indoor coil temperature monitoring in combination with the defrost cycle monitoring control system described in U.S. Pat. No. 4,627,484. The heat pump system is controlled to minimize energy demand and overall energy consumption while still providing for the user's need for heat. This is accomplished by automatically placing the heat pump system in the lower energy demand state that continues to provide the necessary heat output under existing weather conditions, whether it be heat pump operation alone, heat pump operation in tandem with occasional supplemental heat operation, or supplemental heat operation alone. The outdoor ambient temperature is measured and the prevalence of calls for heat pump system defrosting from the indoor heat exchanger activated control system is monitored. This data is compared with programmed limits for minimum operating outdoor temperature and maximum defrost cycling occurrence within a period of time, and if the limits are exceeded, the control overrides the normal heat pump control by shutting down the heat pump system. Under these conditions, supplemental heat alone is relied upon.

By utilizing a microcomputer to control the system, reprogramming of the limits for defrost cycling shutdown, outdoor ambient temperature disablement and reenablement, heat cycle length, and the like can be easily changed. For example, the constant value representing the maximum proportion of active heat cycle in which the heat pump will be permitted to operate in the defrost mode can be changed for a given heat pump unit. For a heat pump which has a longer defrost cycle, the programmed constant value will be longer. Furthermore, the heat cycle can be measured by the passage of absolute time, regardless of whether the heat pump is operating or not, or by measuring active heat pump operation.

The invention, in one form thereof, relates to a heating system comprising a heat pump for supplying heat to the interior space of a building, the heat pump having a heating mode of operation and a defrost mode of operation. The heat pump includes an indoor heat exchanger that is in thermal contact with the interior space of the building. A thermal sensor in thermal contact with the indoor heat exchanger is connected to a defrost control system, which is responsive to the heat exchanger temperature for causing the heat pump to go into its defrost mode when the indoor heat exchanger temperature falls below a given threshold temperature.

In another form, the invention relates to a heating system comprising a supplemental heating means for supplying heat to an interior space and a heat pump for supplying heat to the interior space, the heat pump having a heating mode of operation and a defrost mode of operation, the heat pump comprising an indoor heat exchanger in thermal contact with the interior space. A thermal sensor is in thermal contact with a the indoor heat exchanger, and a defrost control system connected to the thermal sensor is responsive to the indoor heat exchanger temperature for causing the heat pump to go into its defrost mode when the indoor heat exchanger temperature falls below a given threshold temperature. A heat pump control override system is connected to the defrost control system for detecting when the heat pump is in its defrost mode and disabling the heat pump from operating in its heating mode when the heat pump is detected as operating in its defrost mode for a predetermined portion of a given cyclicly recurring time interval.

It is an object of the present invention to provide a heating system employing a heat pump wherein inefficient operation of the heat pump is avoided.

BRIEF DESCRIPTION OF THE DRAWINGS

These and other objects and advantages of the present invention will be apparent from the detailed description of the preferred embodiment which follows, taken together with the accompanying drawings wherein.

DETAILED DESCRIPTION

Figure 1:
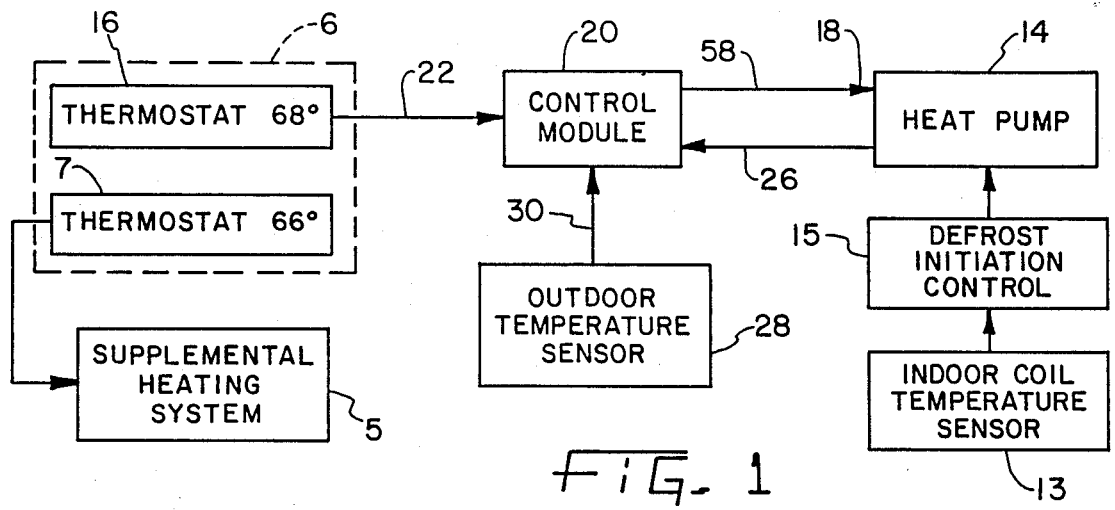
FIG. 1 is a block diagram of a heating system incorporating the control of the present invention.

With reference to FIG. 1, the heating system incorporating the defrost monitoring override control system of the present invention comprises a conventional furnace or heating system 5, such as a gas or oil furnace, a resistance heat furnace, or resistance heaters distributed throughout the building to be heated. A dual set point thermostat 6 comprises a thermostat 7 set at a lower temperature than thermostat 16, and which functions to activate the supplemental heating system 5 when the temperature sensed thereby falls below the set level. Thermostat 16 is connected to control module 20 which has another input from outdoor temperature sensor 28. Control module 20 is connected by line 58 to the control shut-down relay circuit within heat pump 14, and the defrost command line output 26 from heat pump 14 is also connected to control module 20. Indoor coil temperature sensor 13, which may be a thermocouple, hall effect device or other sensor, is connected to defrost initiation control 15, which in turn is connected to heat pump 14 to initiate the defrost cycle.

Furnace 5 and thermostat 7 together form a supplemental heat source, which will be activated when heat pump 14 is unable to satisfy the requirements for heat, such as when the outside ambient temperature is too low or heat pump 14 is in its defrost cycle.

Heat pump thermostat 16, which is set slightly higher than supplemental heat thermostat 7, is connected to the control input 18 of heat pump 14 through control module 20 in a manner to be described below. Generally speaking, when temperature conditions permit and heat pump 14 is not defrost cycling more than a certain portion of the heating cycle, control module 20 connects the thermostat line 22 from heat pump thermostat 16 directly to thermostat line 24 (FIG. 3) connected to the control input 18 of heat pump 14. In this mode, when thermostat 16 calls for heat, and heat pump 14 is not in its defrost mode, heat pump 14 will be activated until the heat requirements have been satisfied, at which time the temperature sensed by thermostat 16 will rise sufficiently so that it will deactive heat pump 14. Heat pump 14 is connected to control module 20 by defrost control line 26, which is connected to the defrost control circuitry 28 within heat pump 14. During the defrost mode of heat pump 14, the outside evaporator coils are heated to melt the frost which has accumulated thereon so that heat pump 14 is not able to supply heat to the building during its defrost cycle. If heat pump 14 is in its defrost cycle, and if the temperature within the building or interior space falls sufficiently, the control system will activate the supplemental heating source 5 in order to satisfy the indoor temperature and to provide heat for defrosting outdoor coils. By way of example, thermostat 7 could be set to 66° F. and heat pump thermostat 16 set to 68° F. so that supplemental heat would not be provided unless heat pump 14 is not able to satisfy the heat demand in normal operation.

Temperature sensor 28 is located exteriorly of the building and is connected to control module 20 by line 30 in order to provide a signal on line 30 indicating the outside ambient temperature. Temperature sensor 28 may be a thermocouple or other suitable temperature sensing device. An indication of outside ambient temperature is provided so that control module 20 can shut down heat pump 14 when the outside ambient is too low, and can reenable heat pump 14 when the outside ambient has risen above a predetermined temperature or has risen by a predetermined amount above the outside ambient temperature at the time of heat pump shutdown. Preferably, control module 20 is located inside the heat pump outdoor unit.

Figure 2:
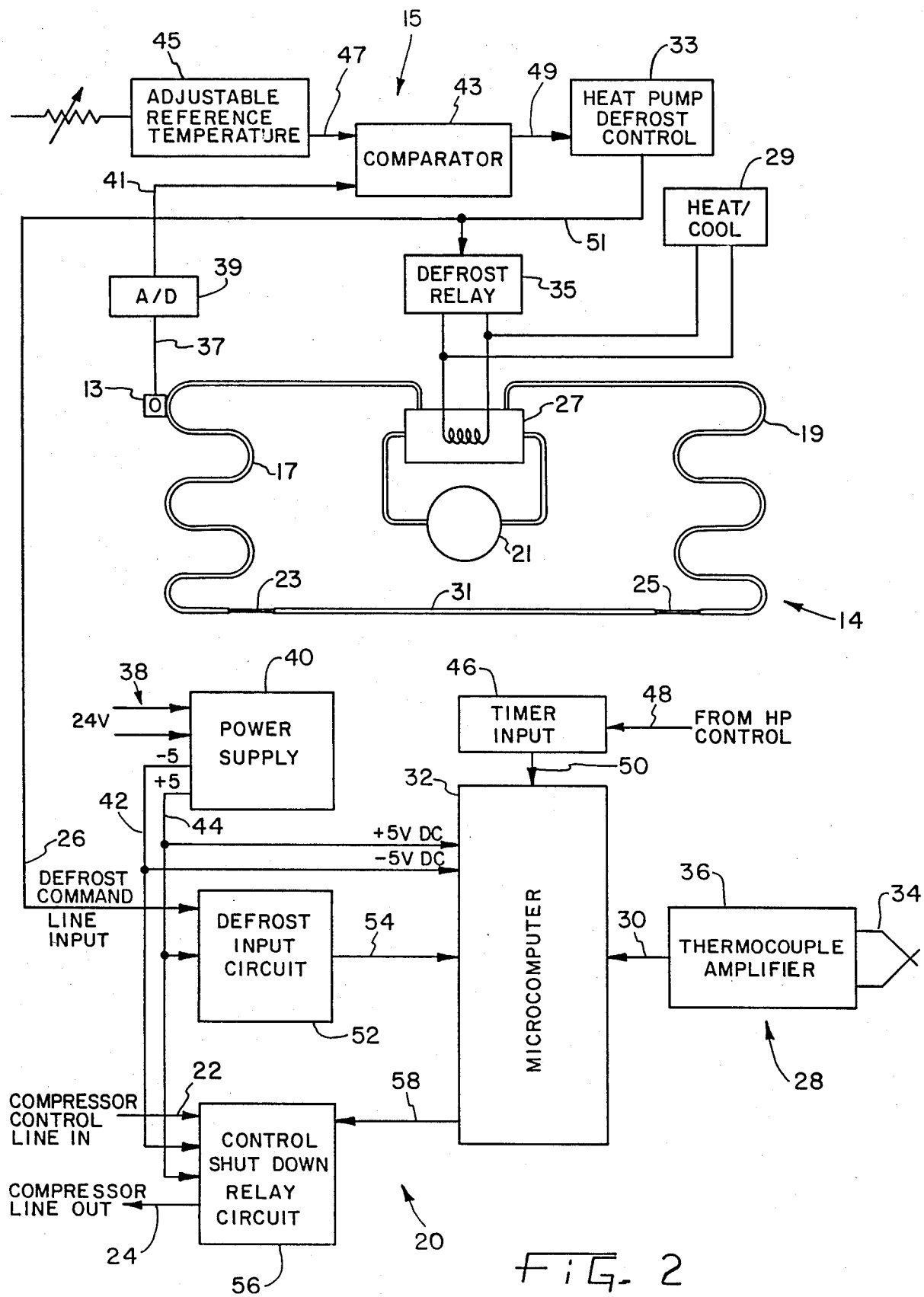
FIG. 2 is a block diagram incorporating the defrost control of the present invention and showing a microcomputer implementation of the present invention and the basic input and output circuits connected thereto.

With reference now to FIG. 2, further details of the heat pump control system are illustrated. Heat pump 14 is shown in simplified form as comprising an outdoor heat exchanger coil 19, an indoor heat exchanger coil 17, a compressor 21 and expansion valves 23 and 25. Heat pump 14 includes a reversing valve 27 connected to the output of compressor 21 to control the direction of refrigerant pumped by compressor 21. If cooling is called for by control switch 29, reversing valve 27 will cause refrigerant compressed by compressor 21 to flow initially through outdoor heat exchanger 19, and from there through line 31, through expansion valve 23 and then through indoor heat exchanger coil 17 wherein the expanded gas will absorb heat from the indoor ambient air. In the heating mode, valve 27 reverses so that refrigerant is initially pumped through indoor coil 17, which now functions as the condenser, and gives up heat to the indoor ambient air before flowing through line 31 and then through evaporator 19 located outside of the building wherein heat is absorbed from the outdoor ambient air.

As is known, when heat pump 14 is in the heating mode, if defrosting is necessary, valve 27 reverses so that refrigerant initially flows through outdoor coil 19, thereby increasing the temperature of coil 19 and melting any frost that is built up thereon. In conventional heat pumps, the defrost cycle is initiated by a timer, by a sensor which senses outdoor ambient temperature, by a sensor which is responsive to compressor motor current, or by other means. This activating signal would cause heat pump defrost control circuit 33, which is an integral part of heat pump 14, to activate defrost relay 35, which in turn reverses reversing valve 27. When the defrost cycle has timed out, as determined by a timer integral to the heat pump defrost circuit 33, relay 35 is again actuated in the opposite direction to reverse valve 27 thereby causing indoor heat exchanger 17 to again function as the condenser.

In accordance with the present invention, the heat pump defrost control system has been modified to respond, not to outdoor ambient temperature or other conditions, but rather to the temperature of the indoor heat exchanger 17. A temperature sensor 13, which may be a thermocouple, hall effect device or other sensor, is preferably connected directly to indoor heat exchanger 17 and is responsive to the temperature thereof. It produces on line 37 an electrical signal which corresponds to the temperature of heat exchanger 17. This signal is connected to analog-to-digital converter 39, which converts the analog signal to digital form on line 41 connected to the input of comparator 43. The other input to comparator 43 is provided by an adjustable reference temperature selector 45, which can be adjusted to any temperature level to provide an output 47 that corresponds to the temperature of the indoor coil 17 at which defrost cycling is to be initiated. Comparator 43 compares inputs 41 and 47 and when input 41 is less than input 47, produces an enabling signal on output 49 to heat pump defrost control 33, thereby calling for defrosting in the same manner as would an enabling signal from an outdoor temperature sensor, compressor current sensor, or the like, as in conventional heat pumps. Thus, the indoor coil temperature signal is substituted for other conventional defrost initiating signals, and this causes the heat pump defrost control circuit 33 to provide an actuating signal on line 51 that activates defrost relay 35, which in turn reverses reversing valve 27 to cause outdoor coil 17 to function as the condenser. When the defrost cycle times out, which is typically under the control of an internal timer within the heat pump defrost control system 33, defrost relay 35 is controlled to reverse valve 27 thereby causing indoor coil 17 to again function as the condenser. After the system resumes full operation, the heat pump defrost control 33 would again be responsive to a low temperature indication from the output 49 of comparator 43 to initiate defrost. Although the heat pump 14 and its control are shown in somewhat simplified form, such heat pumps and controls are conventional and well known.

Although temperature sensor 13 is preferably a thermocouple or other electrical device in direct physical contact with indoor heat exchanger 17, it could also be spaced slightly from coil 17 so as to be responsive to indoor air which has just passed over coil 17. As an alternative to the comparator system disclosed in FIG. 2, a sensor (not shown) which is merely responsive to a given temperature level to provide an output signal, either electrical or mechanical, could be utilized. However, the adjustable system shown in FIG. 2 is preferred.

As indicated, the present invention wherein indoor coil temperature is monitored and utilized as the condition to initiate defrost cycling can be employed in a system which monitors defrost frequency to temporarily disable the heat pump and cause full reliance on a supplemental heating system 5 to provide the heating requirements of the building. FIG. 2 illustrates this override system employing control module 20 in the manner in which it is connected to the defrost initiation system just described.

At the heart of the control module 20 is microcomputer 32, which may be a Motorola MC 68705R3 microcomputer, for example. Outside temperature sensor 28 is connected to one of the input pins of microcomputer 32 and may comprise a type J thermocouple 34 connected to an AD594 Thermocouple Amplifier 36. Although thermocouple 34 and thermocouple amplifier 36 are shown as the outside temperature sensor, any other suitable temperature sensing device may be utilized. A 24 volt AC signal on lines 38 from heat pump 14 is connected to power supply 40, which produces on its outputs 42 and 44 the −5 and +5 logic levels which serve as the power supply for microcomputer 32 and other input and output circuits in the system.

Timer input circuit 46 is connected to the 60 hertz line 48 from heat pump 14 and supplies a low voltage input 50 to microcomputer 32 in order to drive the timer within microcomputer 32 for computation of the various time limits required for the system operation. Defrost input rectifier circuit 52 rectifies the low voltage defrost ON signal on line 26 from heat pump defrost control circuit 33 and supplies an appropriate logic level on input 54 to pin 9 of microcomputer 32 when heat pump 14 is in its defrost cycle. Heat pump thermostat 16 is connected by line 22 through control shutdown relay circuit 56 to the control input 18 of heat pump 14 by relay output line 24. Relay circuit 56 is opened or closed by an appropriate signal on line 58 from microcomputer 32.

Figure 3:
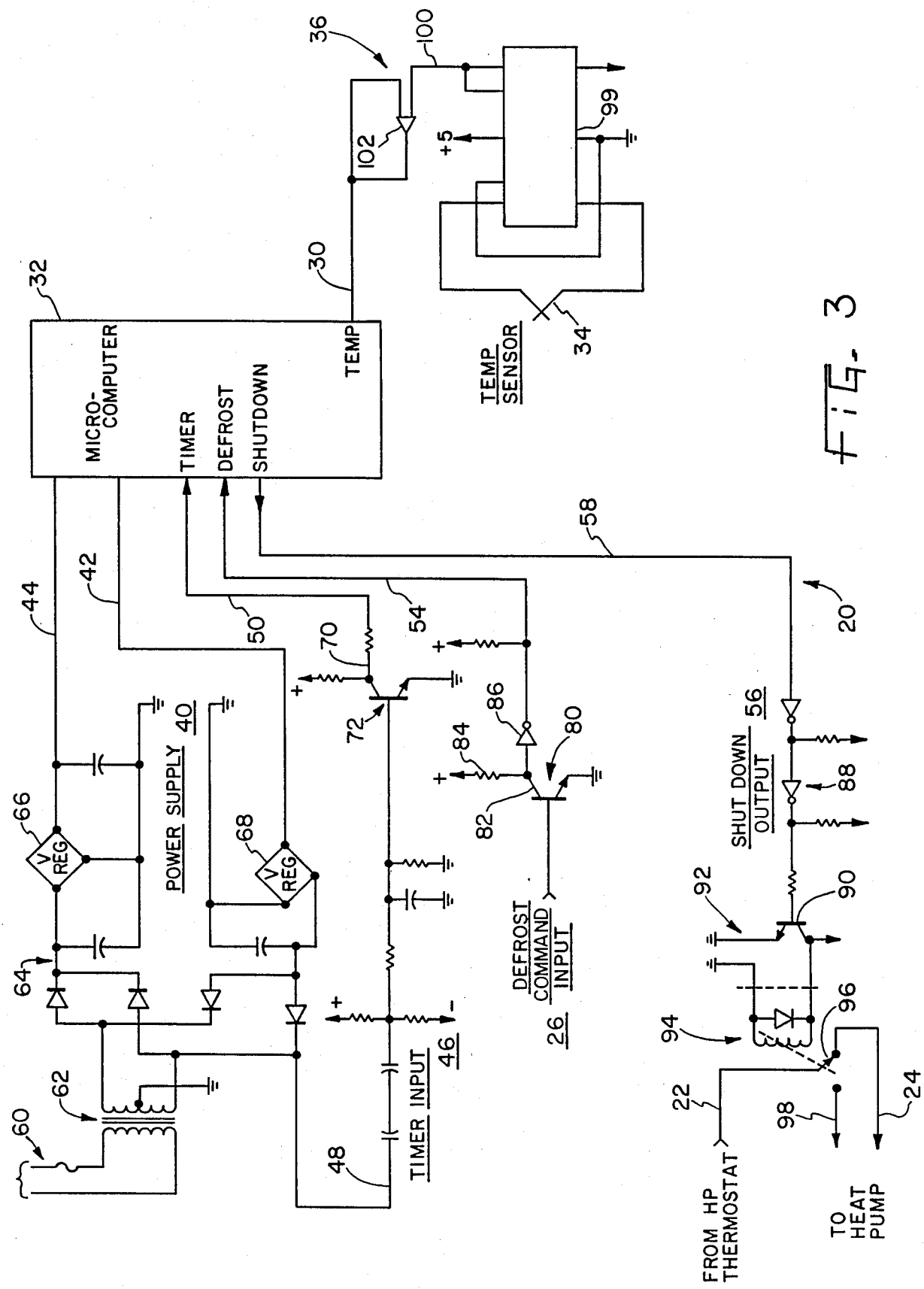
FIG. 3 is a circuit schematic of the circuit inputs and outputs to and from the microcomputer of FIG. 2.
Figure 5:
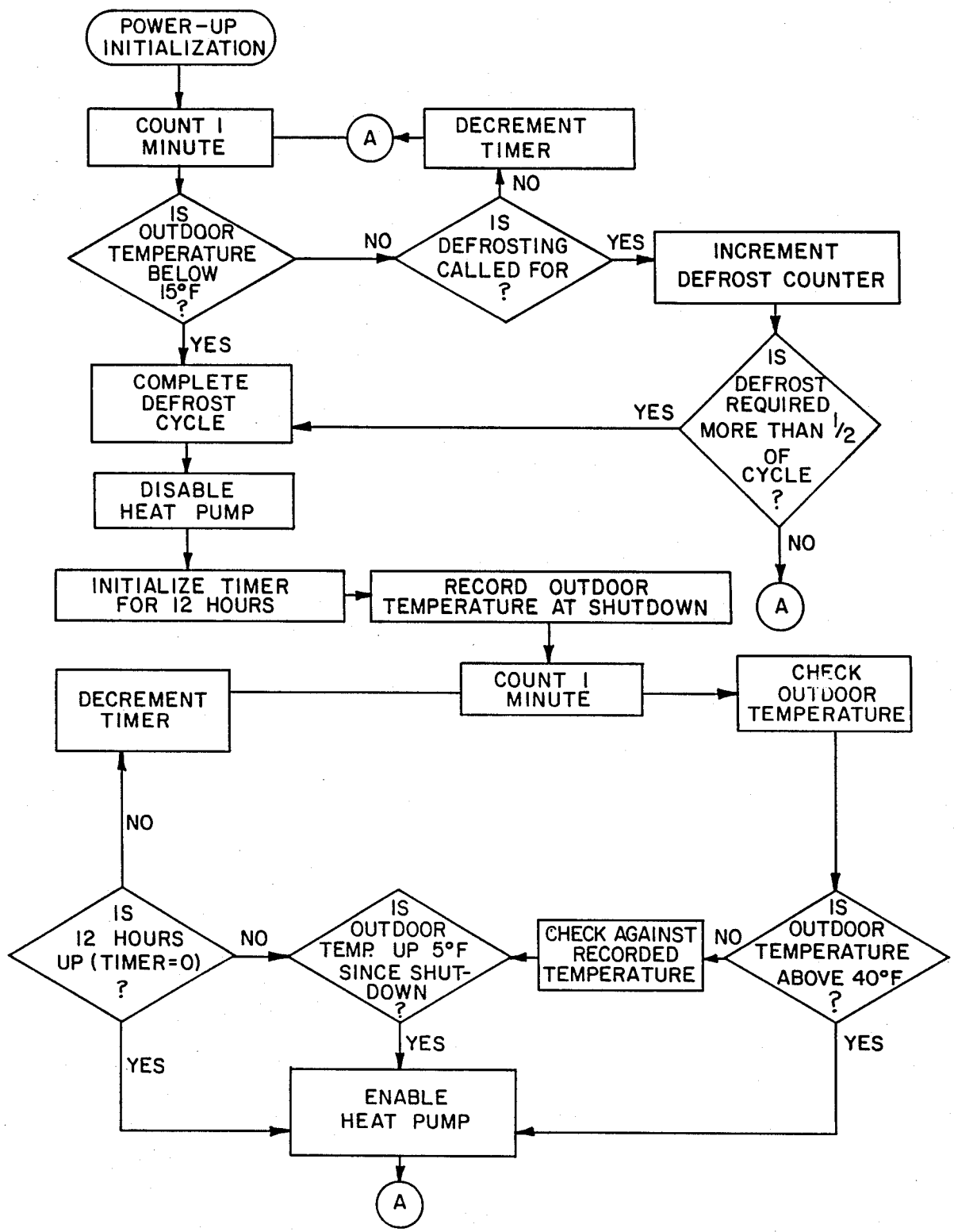
FIG. 5 is a flow chart illustrating the programmed operation of the defrost monitoring override control system.

FIG. 3 illustrates the control module 20 in even greater detail. Power supply 40 receives 110 volt AC current on lines 60, which is stepped down to 24 volts by transformer 62. Full wave rectifier 64, which includes voltage regulators 66 and 68, converts the AC current to the appropriate DC power supply levels on lines 44 and 42 connected to microcomputer 32.

Timer input circuit 46 converts the 24 volt AC current on line 48 to a pulse output on line 70 connected to the collector of transistor 72. The pulse signal on line 80 alternates between the logic 1 and logic 0 levels and is connected by line 50 to pin 8 of microcomputer chip 32.

The AC defrost signal on line 26 is connected to the base of transistor 80. The collector 82 of transistor 80 is connected to logic 1 voltage through resistor 84 as is the output of inverter 86. Thus, when the defrost signal appears on line 26, the output 54 of inverter 86 will carry a logic 1 signal connected to pin 9 of microcomputer 32.

Pin 10 from microcomputer 32 is connected by line 58 to the input of heat pump shutdown output circuit 56. Data register C1 in microcomputer 32 goes high when heat pump shutdown is called for; this output is connected through a double inversion circuit 88 and is connected to the base 90 of transistor 92. The output of transistor 92 activates a reed relay 94 causing contact 96 to move from its normally closed position in contact with line 24 to its open position in contact with terminal 98. Terminal 98 may be connected to an indicator light (not shown), if desired. The input to moveable contact 96 is line 22 from heat pump thermostat 16. Thus, when relay 94 is activated, it disconnects thermostat line 22 from heat pump 14, thereby causing disablement of heat pump 14.

Temperature sensor 28 comprises a type J thermocouple 34 connected to an AD594 Thermocouple Amplifier 99, which produces a 10 millivolt output for each tenth of a millivolt input from thermocouple 34. The output 100 of amplifier 99 is connected through OP Amp 102 to pin 24 of microcomputer 32. OP Amp 102 converts the output of amplifier 99 to various voltages within a range of from 0 to +5 volts, which is connected to the analog to digital converter built into microcomputer 32. The software within microcomputer 32 converts the analog input to a digital value which is read as the ambient outdoor temperature. Thermocouple 34 is preferably located on or near the outdoor unit of heat pump 14.

Figure 4:
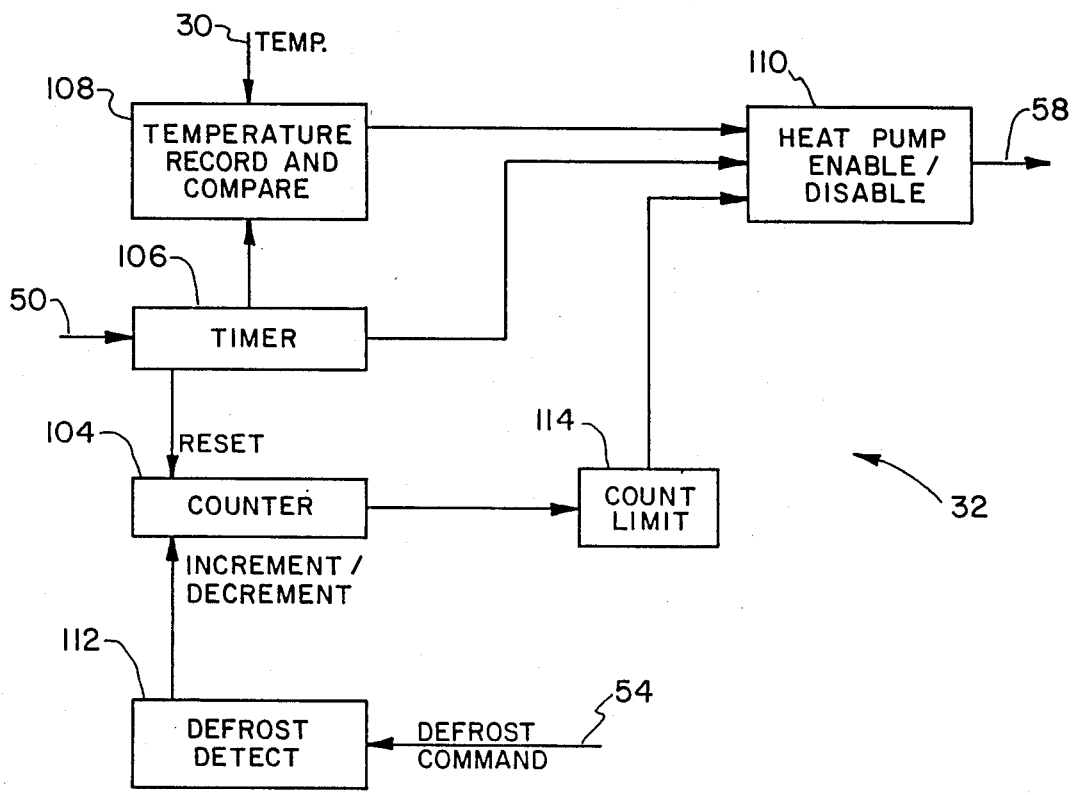
FIG. 4 is a block diagram of several of the functional blocks making up the microcomputer.

FIG. 4 illustrates in a diagrammatic fashion some of the functional blocks of microcomputer 32. Microcomputer 32 comprises a counter 104 that is reset by timer 106 driven by the 60 hertz AC input 50. The outdoor ambient temperature signal on line 30 is recorded in block 108 and compared with the sensed outdoor ambient temperature on the next interrogation of sensor 28 to determine whether the temperature has increased by a predetermined amount, for example, 5° F. Block 108 disables heat pump 14 when the outdoor ambient is below a certain level, for example, 15° F., and reenables heat pump 14 when the outdoor temperature is above a predetermine level, for example, 40° F. Block 108 also reenables heat pump 14 when the outdoor ambient has risen by a predetermined amount, for example, 5° F. The reason for requiring a certain increment of temperature increase to occur before reenablement of heat pump 20 is to avoid frequent on and off cycling. Block 108 is connected to heat pump enable/disable block 110.

Timer 106 is also connected to heat pump enable/disable block 110 and causes reenablement of heat pump 14 after a certain period of time, for example, 12 hours. Even though the temperature may not have risen 5° in this time period, it may have risen sufficiently, or the humidity conditions may have dropped sufficiently, to enable the heat pump to operate efficiently.

Counter 104 is incremented or decremented by a signal from defrost detect block 112, depending on whether heat pump 14 is in its defrost mode or not. Microcomputer 32 causes interrogation of the heat pump defrost circuitry on a periodic basis, and in the disclosed embodiment, counter 104 is incremented if heat pump 14 is defrosting and decremented if it is not defrosting. Of course, the counter could be decremented during defrost conditions and incremented if heat pump 14 is not defrosting, depending on the programming of microcomputer 32. When counter 104 reaches a predetermined limit as sensed by count limit detect block 114, thereby indicating that heat pump 14 has been in its defrost mode for a predetermined portion of the heating cycle, for example, 50% of the time, then enable/disable block 110 will disable heat pump 14 by interrupting heat pump thermostat control line 22, 26. Timer 106 establishes the heating cycle for counter 104 and will reset it when the heating cycle has been completed so that counter 104 will begin counting back up from zero. In the disclosed embodiment, microcomputer 32 programs counter 104 to have a minimum value of zero and will trigger shutdown of heat pump 14 when the counter within counter 104 reaches a count equal to 50% of the total number of interrogations of the system during one heating cycle. A typical heat cycle would be one hour long.

FIG. 4 illustrates the operation of microcomputer 32. Microcomputer 32 first goes through a power up initialization routine which resets all system counters including counter 104 (FIG. 4), sets data direction registers, and otherwise prepares for the monitor/control routine. A prescaled timer function then counts one minute and the sensed outdoor temperature is sampled and compared with the minimum outdoor temperature allowed for normal operation, in this case 15° F. If the outdoor temperature is below the minimum allowed, microcomputer 32 initiates shutdown control of the heat pump thereby activating relay 94 (FIG. 3). If the outdoor temperature is not below the minimum (15° F.), microcomputer 32 interrogates the mode of operation of heating pump 14. If heat pump 14 is not defrosting, then counter 104 is decremented and the procedure is repeated, beginning with the one minute timing sequence. If the heat pump is defrosting, however, as determined by the defrost control line 34, defrost counter 104 is incremented. Defrost counter 104 is then compared with the allowed limit, and if the count is not above the limit, the program returns to the one minute timing sequence. If counter 104 is above the defrost limit, however, microcomputer 32 initiates shutdown control of the heat pump system by activating relay 92.

When microcomputer 32 initiates shutdown of the heat pump, it first monitors defrost control line 54, and shutdown is deferred until line 54 is at a logic 0, thereby indicating that the defrost cycle has been completed. Shutdown control circuit 56 is then activated and heat pump 14 is disabled. A prescaled countdown timer 106 (FIG. 4) is then initiated, and the outdoor temperature obtained and recorded. To this temperature is added a differential temperature constant, and the sum is stored in a RAM.

While heat pump 14 is the shut down mode, the outdoor temperature is periodically checked and countdown timer 104 decremented at one minute intervals. The computer checks the outdoor temperature, compares this reading against the upper limit (40° F., for example) and if the outdoor temperature is above the predetermined limit, heat pump 14 is again enabled and the sequence begins with the one minute count. If the outdoor temperature is below the upper limit, the temperature is then checked against the recorded temperature, and if the temperature is greater than the temperature at shutdown by a predetermined amount (5° F., for example), heat pump 14 is again enabled. If the outdoor temperature is not 5° higher than the temperature at shutdown, timer 104 is decremented, a time period of one minute is counted, and the outdoor temperature is then checked again. This procedure is continued until either the countdown timer 104 times out, the outdoor temperature has risen more than 5° above the temperature at shutdown, or the outdoor temperature is above 40° F.

The process to enable normal heat pump operation begins with an interrogation of the outdoor temperature. Unless this temperature is greater than the minimum for normal operation, countdown timer 104 is reinitialized and shutdown is continued. If the outdoor temperature is above the predetermined upper level, shut down control circuit 56 (FIG. 3) is deactivated, reed relay coil 94 deenergized and the connection between thermostat lines 22 and 24 is reestablished. Microcomputer 32 then returns to the normal monitoring routine.

The following is a suitable program for microcomputer 32 to perform the operation described above:

```
A     ADATA    EQU    $000
A     BDATA    EQU    $001
A     CDATA    EQU    $002
```

-continued

| | | | | |
|---|---|---|---|---|
| A | ADDR | EQU | $004 | |
| A | BDDR | EQU | $005 | |
| A | CDDR | EQU | $006 | |
| A | TIMDAT | EQU | $008 | |
| A | TIMCTL | EQU | $009 | |
| A | TEMCTL | EQU | $00E | |
| A | OUTEMP | EQU | $00F | |
| A | EIGHTY | EQU | $80 | |
| | | ORG | $10 | |
| | * | VARIABLE TABLES | | |
| A | COUNT0 | RMB | 1 | |
| A | COUNT1 | RMB | 1 | |
| A | LOWLMT | RMB | 1 | |
| A | UPLMT | RMB | 1 | |
| A | DEFCNT | RMB | 1 | |
| A | DEFLMT | RMB | 1 | |
| A | TMPREF | RMB | 1 | |
| A | TIME1 | RMB | 1 | |
| A | TIME2 | RMB | 1 | |
| | * | PROGRAM ORIGIN | | |
| | | ORG | $80 | |
| | * | RESET INITIALIZATION | | |
| | INIT | RSP | | |
| A | | LDA | #$00 | |
| A | | STA | ADATA | |
| A | | STA | CDATA | |
| A | | STA | LOWLMT | |
| A | | STA | DEFCNT | |
| A | | STA | ADDR | |
| A | | LDA | #$01 | |
| A | | STA | BDATA | |
| A | | STA | BDDR | |
| A | | LDA | #$02 | |
| A | | STA | CDDR | |
| A | | LDA | #$8D | |
| A | | STA | UPLMT | |
| A | | LDA | #$1E | |
| A | | STA | DEFLMT | |
| A | | LDA | #$07 | |
| A | | STA | COUNT1 | |
| A | | LDA | #$FF | |
| A | | STA | COUNT0 | |
| A | | STA | TIMDAT | |
| A | | LDA | #%00001111 | |
| A | | STA | TIMCTL | |
| | | CLI | | |
| 00AE | | BRA | * | |
| | * | TIMER INTERRUPT | | |
| A | TIRQ | DEC | COUNT0 | |
| 00CA | | BNE | AGAIN | |
| A | | DEC | COUNT1 | |
| 00CA | | BNE | AGAIN | |
| | | SWI | | GOTO COMMUNICATIO |
| | * | MONITOR ROUTINES | | |
| 00C0 | | BRSET | 1,CDATA, MONITO | |
| 00D3 | MONIT1 | BSR | TMPCHK | MONIT NORMAL OPER |
| 00C2 | | BRA | WAYCUT | |
| 010D | MONIT0 | BSR | MONIT2 | |
| A | WAYOUT | LDA | #$FF | |
| A | | STA | COUNT0 | |
| A | | LDA | #$07 | |
| A | | STA | COUNT1 | |
| A | AGAIN | LDA | #$FF | |
| A | | STA | TIMDAT | |
| A | | LDA | #%00001111 | |
| A | | STA | TIMCTL | |
| | | RTI | | |
| | * | CHECK TEMP & DEFROST | | |
| 0135 | TMPCHK | BSR | GETEMP | |
| A | | CMP | LOWLMT | |
| 00F9 | | BLS | SHUTDN | |
| 00E6 | | BRSET | 0,CDATA,DEFCHK | |
| | ** | BRANCH IF RESISTIVE HEAT ON | | |
| 00E6 | | BRSET | 2,CDATA,DEFCHK | |
| A | | TST | DEFCNT | |
| 00E2 | | BEQ | RETURN | |
| A | | DEC | DEFCNT | |
| | RETURN | RTS | | |
| A | DEFCHK | LDA | DEFCNT | CHECK DEFROST |
| | | INCA | | |
| A | | CMP | DEFLMT | |
| 00F0 | | BHI | CHKALM | |

-continued

| | | | |
|---|---|---|---|
| A | STA | DEFCNT | |
| | RTS | | |
| 0135 | CHKALM BSR | GETEMP | |
| A | CMP | UPLMT | DEFROST IN |
| 00F9 | BLS | SHUTDN | WARM WEATHER? |
| A | BCLR | 0,BDATA | SEND ALARM |
| | RTS | | |
| | * | SHUTDOWN ROUTINE | |
| 00F9 | SHUTDN BRSET | 0,CDATA,SHUTDN | |
| A | BSET | 1,CDATA | SHUT IT DOWN |
| 0135 | BSR | GETEMP | |
| A | ADD | #$19 | |
| A | STA | TMPREF | RESUME AT TEMP |
| A | LDA | #$B4 | |
| A | STA | TIME1 | INITIALIZE 12 |
| A | LDA | #$04 | HOUR TIMER |
| A | STA | TIME2 | |
| | RTS | | |
| | * | MONITOR SHUTDN | |
| 0135 | MONIT2 BSR | GETEMP | |
| A | CMP | LOWLMT | |
| 011B | BLS | LOOP0 | |
| A | CMP | UPLMT | |
| 012E | BHS | RESUME | |
| A | CMP | TMPREF | |
| 012E | BHS | RESUME | |
| | ***** | 12 HOUR SHUTDOWN TIMER | |
| A | LOOP0 LDA | TIME1 | |
| | LOOP1 DECA | | |
| 0123 | BEQ | LOOP2 | |
| A | STA | TIME1 | |
| | RTS | | |
| A | LOOP2 LDA | TIME2 | |
| | DECA | | |
| 012E | BEQ | RESUME | |
| A | STA | TIME2 | |
| A | LDA | #$B4 | |
| 011D | BRA | LOOP1 | |
| | ***** | RESUME NORMAL OPERATION | |
| A | RESUME BCLR | 1,CDATA | |
| A | LDA | #$00 | |
| A | STA | DEFCNT | INITIALIZE DEFROS |
| | RTS | | |
| | ***** | GET OUTDOOR TEMP | |
| A | GETEMP LDA | #$00 | |
| A | STA | TEMCTL | |
| 0139 | TEMRDY BRCLR | 7,TEMCTL,TEMRDY | |
| A | LDA | OUTEMP | |
| | RTS | | |
| | ***** | INTERRUPT TO COMMUNICATE | |
| | ***** | WITH BUILD MONITOR - SERIAL | |
| | POLL | RTI | NO TALK THIS VERS |
| | ***** | INTERRUPT VECTORS & MOR | |
| | ORG | $F38 | MOR |
| A | FCB | $8F | |
| | ORG | $FF8 | INTERRUPT VECTORS |
| A | FDB | TIRQ | |
| A | FDB | POLL | |
| A | FDB | POLL | |
| A | FDB | INIT | |
| | END | | |

By using a microcomputer 32 for control of the system, the various limits and values can be easily programmed so that the system can be adapted for use in a variety of climatic areas and with a variety of different commercially available heat pumps. Although counter 104 has been programmed so that it increments when heat pump 14 is in the defrost mode, it could be programmed to decrement when this condition occurs, and increment when there is no heat pump defrost.

By monitoring the indoor coil temperature to initiate the defrost cycle, the heat pump system will go into the defrost cycle only when there is a need therefor, as determined by a low temperature on the indoor coil 17 indicating inefficient operation of the system. This greatly simplifies the control of the heat pump and, when used in conjunction with the defrost monitoring override system described herein, causes the heat pump to be temporarily bypassed when the heat pump is not able to operate efficiently over an extended period of time.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A heating system comprising:

supplemental heating means for supplying heat to an interior space, heat pump means for supplying heat to the interior space, said heat pump means for comprising an indoor heat exchanger in thermal contact with the interior space, control means including at least one thermostat having a sensor in the interior space for activating one or both of said supplemental heating means and said heat pump means into operation, a thermal sensor in thermal contact with said indoor heat exchanger, defrost control means connected to said thermal sensor and said heat pump means and responsive to indoor heat exchanger temperature for causing said heat pump means to go into its defrost mode when the indoor heat exchanger temperature falls below a preset threshold temperature, and heat pump control override means connected to said defrost control means for detecting when said heat pump means is in its defrost mode and disabling said heat pump means from operating in its heating mode when the heat pump means is detected as operating in its defrost mode for a predetermined portion of a given cyclically recurring time interval.

2. The heating system of claim 1 wherein said heat pump override means comprises: a counter, means for one of incrementing and decrementing said counter when said heat pump means is detected as being in its defrost mode and for the other of incrementing an decrementing said counter when said heat pump means is detected as not being in its defrost mode, and means for detecting said counter reaching a predetermined limit and disabling said heat pump means in response to said counter reaching said predetermined limit.

3. The heating system of claim 1 wherein said override means includes means for detecting outside ambient temperature and disabling said heat pump means when the outside ambient temperature detected thereby falls below a predetermined shutdown level.

4. The heating system of claim 1 wherein said override means includes: means for measuring and recording the outside ambient temperature, and means for reenabling said heat pump means after disabling when one of the following conditions occurs:
 (a) the measured outside ambient temperature exceeds a predetermined restore temperature level,
 (b) the measured outside ambient temperature level is a predetermined amount higher than the outside ambient temperature when said heat pump means was last disabled.

5. A heating system comprising:

heat pump means for supplying heat to an interior space, said heat pump means having a heating mode of operation and a defrost mode of operation, said heat pump comprising an indoor heat exchanger in thermal contact with the interior space, a thermal sensor in thermal contact with said indoor heat exchanger, defrost control means connected to said thermal sensor and said heat pump means and responsive to indoor heat exchanger temperature for causing said heat pump means to go into its defrost mode when the indoor heat exchanger temperature falls below a preset threshold temperature, and heat pump control override means connected to said heat pump means for monitoring the frequency of defrost and disabling the heat pump means from operating in its heating mode when defrost frequency exceeds a given level.

6. The heating system of claim 5 wherein said thermal sensor is in direct physical contact with said indoor heat exchanger and includes means for providing an electrical signal corresponding to the temperature of said heat exchanger, and said defrost control means is responsive to said signal.

7. The heating system of claim 6 wherein said thermal sensor is a thermocouple.

8. The heating system of claim 5 wherein said thermal sensor is responsive to the temperature of the air surrounding said heat exchanger.

* * * * *